United States Patent [19]

Steele

[11] Patent Number: 4,599,798
[45] Date of Patent: Jul. 15, 1986

[54] LAYOUT DEVICE FOR WORD PROCESSORS

[76] Inventor: James Steele, 923 Sundown La., DeSoto, Tex. 75115

[21] Appl. No.: 752,029

[22] Filed: Jul. 5, 1985

[51] Int. Cl.⁴ ............................................... G01B 5/00
[52] U.S. Cl. .......................................... 33/1 B; 33/566
[58] Field of Search ................. 33/1 B, 562, 563, 566, 33/DIG. 1; 283/1 A

[56] References Cited

U.S. PATENT DOCUMENTS

| | | | |
|---|---|---|---|
| 1,189,277 | 7/1916 | Martens | 33/1 B |
| 1,205,879 | 11/1916 | Felten | 33/1 B |
| 1,421,975 | 7/1922 | Meyers | 33/1 B |
| 2,375,427 | 5/1945 | Mannino | 33/1 B |
| 2,693,035 | 11/1954 | Beck | 33/1 B |
| 2,720,028 | 10/1955 | Wolf | 33/1 B |
| 2,992,484 | 7/1961 | May | 33/1 B |
| 4,435,906 | 3/1984 | Mori | 33/DIG. 1 |
| 4,475,288 | 10/1984 | Pellegrom | 33/1 B |

*Primary Examiner*—Richard R. Stearns
*Attorney, Agent, or Firm*—Thomas L. Cantrell

[57] ABSTRACT

Disclosed is an apparatus for facilitating lay-out of printed work to be produced on a work processor. The apparatus includes a rectangular base sheet, a transparent cover sheet substantially equal to the base sheet in length and width; the two sheets are attached together along one edge and have magnetically actuated clamp means for attaching them together along an opposite edge. Alignment strips are provided along the base sheet and cover sheet along the top left-hand edge for aligning a work place between the two sheets. A transparent grid sheet is provided to supply indicia enabling the user to locate particular positions on a work sheet, or work piece placed between the base sheet and cover sheet. Preferably also a margin locator sheet having indicia along two edges representing the margin set points of the work processor/printer is employed with the apparatus of the invention. In use, a user reads off the grid locator sheet the cursor positions for properly locating the material to be keyed into the word processor.

10 Claims, 7 Drawing Figures

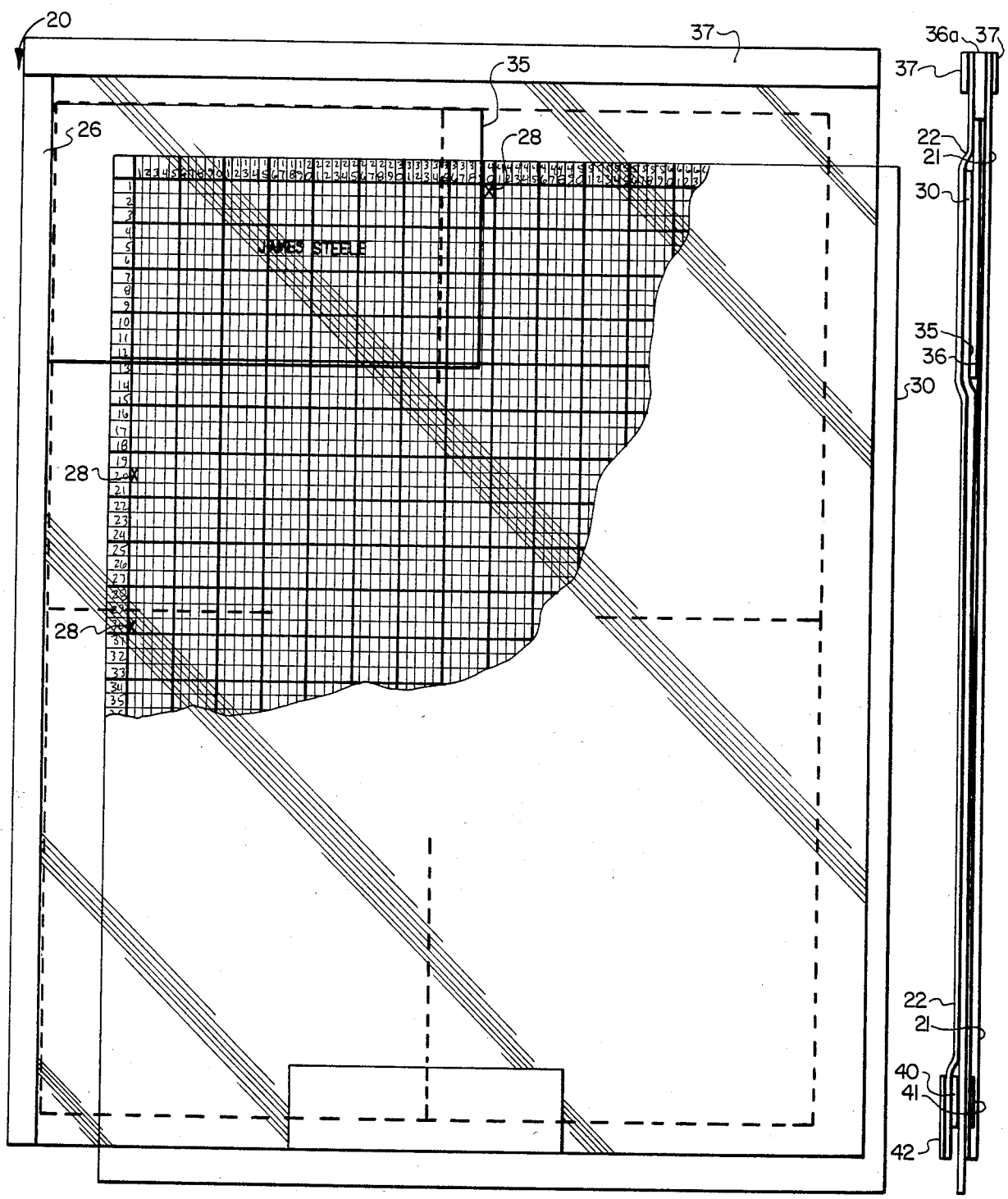
FIG. 5
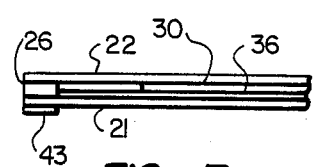
FIG. 7
FIG. 6

LAYOUT DEVICE FOR WORD PROCESSORS

BACKGROUND OF THE INVENTION

With a conventional typewriter, a typist can plan or layout the distribution of printing on a sheet of paper fairly easily because the place where the printing hammer strikes upon typing can be observed directly. However, this is not the case with most word processors. With most word processors, the planning and layout work and initial composition work are all done on a cathode ray tube screen, and only after the layout and composition work is done, is work product printed on a separate printer which is sometimes at a location remote from the balance of the work processor. For certain kinds of work, difficulties have been encountered in easily laying out the work on the cathode ray tube screen so that it will print on paper in the manner desired. These difficulties become particularly acute when the word processor is being used to fill in blanks on a printed form, or to address envelopes, or to place material on small file cards. Accordingly, there is a need for appliances to aid typists in doing their layout work on a cathode ray screen of a word processor in a manner so that the product coming out of the printer has the desired layout.

SUMMARY OF THE INVENTION

In accordance with the invention there is provided a new apparatus for facilitating layout work with a word processor. In its preferred form the apparatus includes a rectangular base sheet and a rectangular transparent cover sheet which is substantially equal to the base sheet in length and width. The cover sheet is arranged to overlie the base sheet, is in substantial registry therewith, and the two sheets are attached together along one mutual edge thereof; this edge will sometimes be referred to herein as the top edge of the apparatus. The apparatus further includes magnetically actuated clamp means on the base sheet and cover sheet near the edges of the sheets which are opposite the top edge or edge of attachment. The edge at which the clamp means are located is sometimes referred to herein as the bottom edge of the apparatus. The apparatus in its preferred form also includes linear alignment means positioned between the base sheet and the cover sheet along the edge of attachment or top edge, and also along an edge that is adjacent to the top edge. In the preferred embodiment this latter edge is sometimes referred to as the left-hand edge. Finally, the apparatus includes a transparent grid sheet having rectilinear grid indicia place thereon. The grid sheet is positionable between the base sheet and the cover sheet in a manner to be described below to facilitate the planning and layout work on the word processor.

In the preferred embodiment, another sheet is employed, namely a margin locator sheet which has margin indicia on it along two adjacent edges, such as its top and left side. The margin locator sheet is insertable between the base sheet and cover sheet and is abuttable against the linear alignment means located between those sheets.

The device may also have tacky adhesive areas on the base sheet for facilitating the maintenance of any sheet placed on it in a selected position, including most particularly, the margin locator sheet mentioned above.

It is preferred that the linear alignment means mentioned above be in the form of abutment strips attached to the base strip along the edge of attachment or top edge and along an adjacent edge, preferably the left-hand edge.

The preferred form of the magnetically actuated clamp means on the base sheet and cover sheet includes a magnet mounted on one of the sheets, such as the cover sheet, and a piece of magnetically responsive material such as a strip of steel, for example, mounted on the other sheet such as the base sheet. The magnet and the responsive material are preferably in at least partial areal alignment when the cover sheet and base sheet are in overlying relationship to each other.

If desired, the margin indicia may be placed directly on the base sheet instead of on a separate margin locator sheet as outlined in the discussion above.

It is much preferred that the rectilinear grid indicia on the grid sheet be dimensioned to conform with a selected type size being used or contemplated for use on the printer of the word processor.

It is also greatly preferred that the rectilinear grid indicia on the grid sheet be numerically labeled along their margins, preferably the top and the left-hand margins thereof.

It is also preferred that the cover sheet have indicia on it outlining the size of a selected stationery sheet size such as 8½ by 11 inch "letter size" stationery commonly used in the United States.

The manner in which the objects of the invention are carried out may be better understood by a consideration of the detailed description which follows together with the accompanying drawings.

BRIEF DESCRIPTION OF THE DRAWINGS

FIG. 5 is a plan view of the device of the invention with an index card or small envelope positioned therein to illustrate one mode of use of the device;

FIG. 6 is a side view of the device shown in FIG. 5; and

FIG. 7 is a partial bottom edge view of the device shown in FIG. 5.

DESCRIPTION OF THE PREFERRED EMBODIMENT

Figure 1:
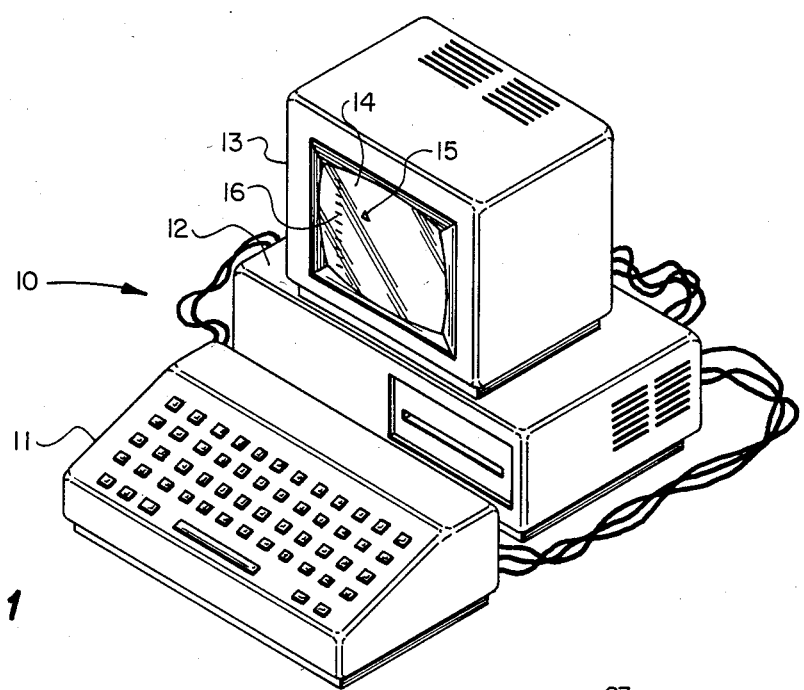
FIG. 1 is a perspective diagrammatic view of the keyboard, cathode ray tube monitor, and computer section of a typical word processor with which the present invention is employed.

Attention is first directed to FIG. 1 where a word processor used in accordance with the invention is designated generally as 10. The word processor includes a keyboard unit 11, a computer unit 12 and a cathode ray monitor unit 13. The monitor unit has a cathode ray tube screen 14. In use a cursor 15 appears on the screen to show the user where the next keystroke will be located, at least on the cathode ray tube screen. Many word processors also have an indicia scale along one or two edges of the cathode ray tube screen and in FIG. 1 this is illustrated diagrammatically at 16. An additional part of the word processor is the printer, which is not shown in FIG. 1, and which may be located at a station somewhat remote from the equipment shown in FIG. 1. Typically, a printer includes platens for holding and moving the paper on which the printing needs to be done, a moveable printhead, and a provision for inking the printhead, such as a typewriter ribbon. The printer also includes settable margin stops and tab stops much in the manner of a conventional typewriter.

Figure 2:
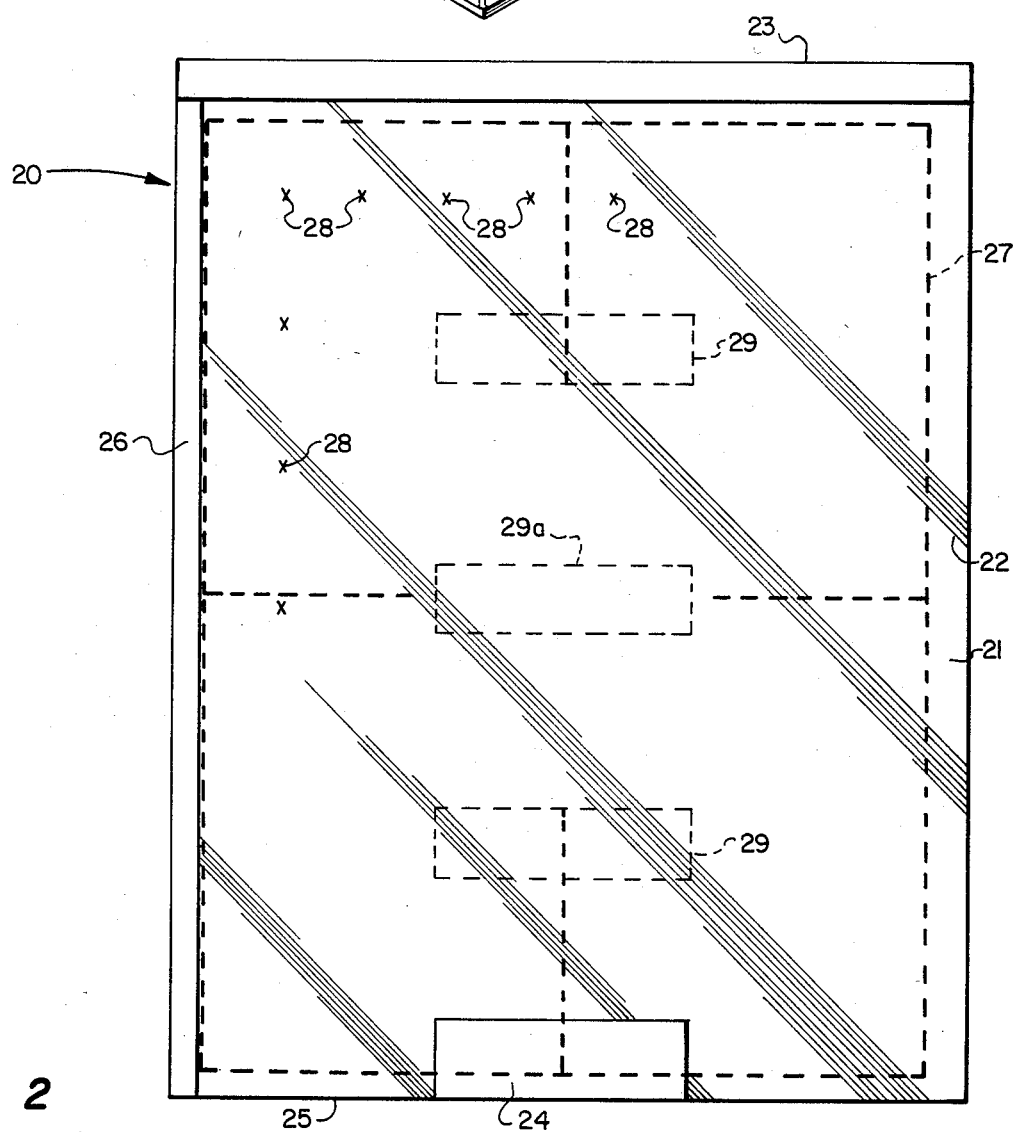
FIG. 2 is a plan view of the device of the invention with a margin locator sheet positioned therein, or alternately considered, with margin indicia located on the base sheet thereof.
Figure 3:
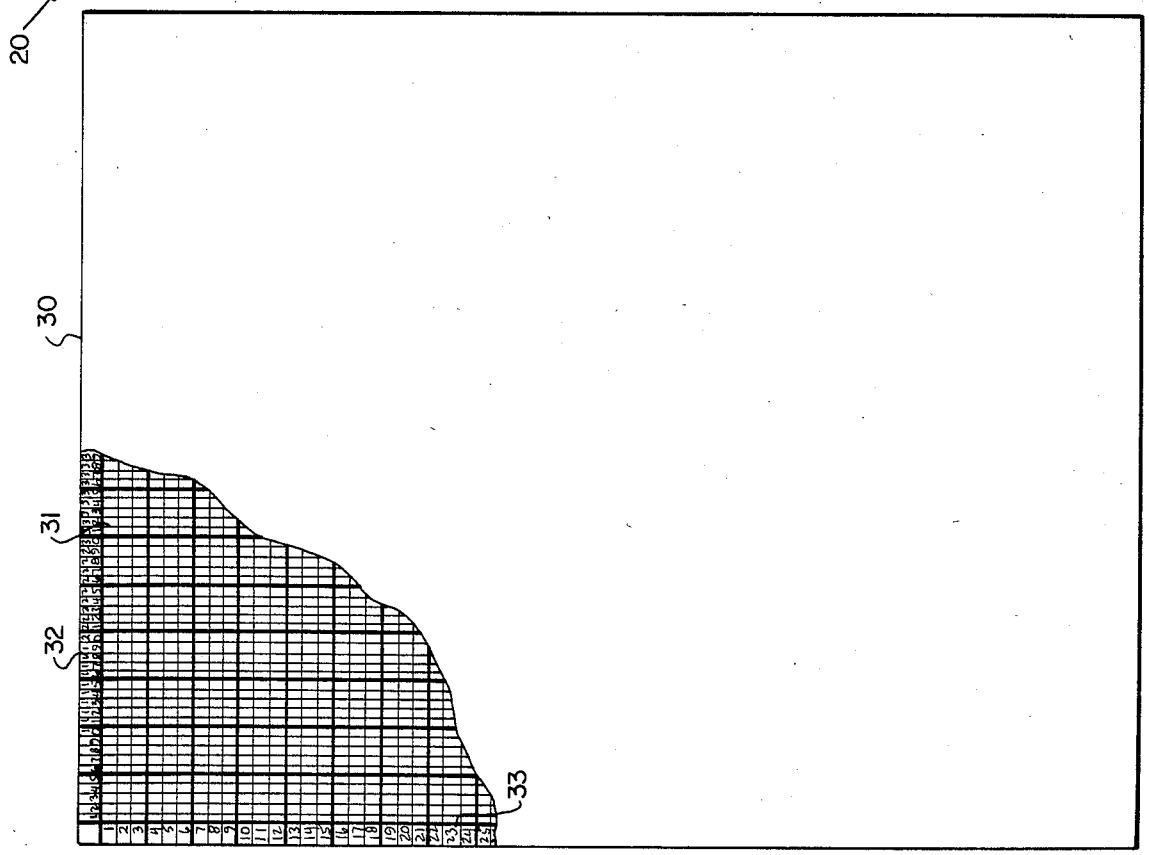
FIG. 3 is a plan view of a grid sheet constructed in accordance with the invention.

Attention is next directed to FIGS. 2 and 3 which show the component parts of the invention. In FIG. 2, the apparatus of the invention is designated generally as 20. It includes a base sheet 21 and an overlying transparent cover sheet 22. The two sheets are preferably substantially the same size and are attached together along their top edge 23. It is preferred that both sheets be constructed of plastic and that at least the cover sheet be transparent. At the bottom of FIG. 2 there can be seen the magnetic clamp member 24 discussed in greater detail below. The clamp is located adjacent the bottom edge 25 of the device. Along the left-hand edge of the device is a linear abutment means 26 in the form of a strip mounted along the left margin of the base member 21. The cover member has on it indicia 27 outlining a standard or preferred size of stationery sheet, such as 8½ by 11 inches, which is commonly used in the United States. Also shown on FIG. 2 are margin indicator indicia 28 which may be applied directly to the base sheet 21, or more preferably printed onto a sheet of paper by the printer of the word processor to show the current state of the top and the left-hand margin settings of that word processor, with the paper sheet then being inserted on top of the base sheet and underneath the cover sheet of the device, as shown in FIG. 2. In order to facilitate holding a margin locator sheet in the desired position within the unit, tacky adhesive areas 29 are preferably formed on the upper surface of the base sheet. Similarly a tacky adhesive area 29a is preferably provided on the underside of cover sheet 22 to assist in holding the grid sheet in the postition described below.

Attention is now directed to FIG. 3 which shows a grid sheet 30 in accordance with the invention. The grid sheet has rectilinear indicia 31 placed thereon. The spacing or sizing of the grid is preferably such as to conform with a selected or preferably standard type size, in particular the type size utilized by the printer of the word processor with which the typist is working. The horizontal grid spaces are numbered along the top edge of the grid sheet as at 32 and the vertical spaces are numbered along the left side edge of the grid sheet as at 33. As FIG. 3 is drawn only a portion of the grid indicia is shown; in actual use the grid indicia cover substantially all of the grid sheet.

Figure 4:
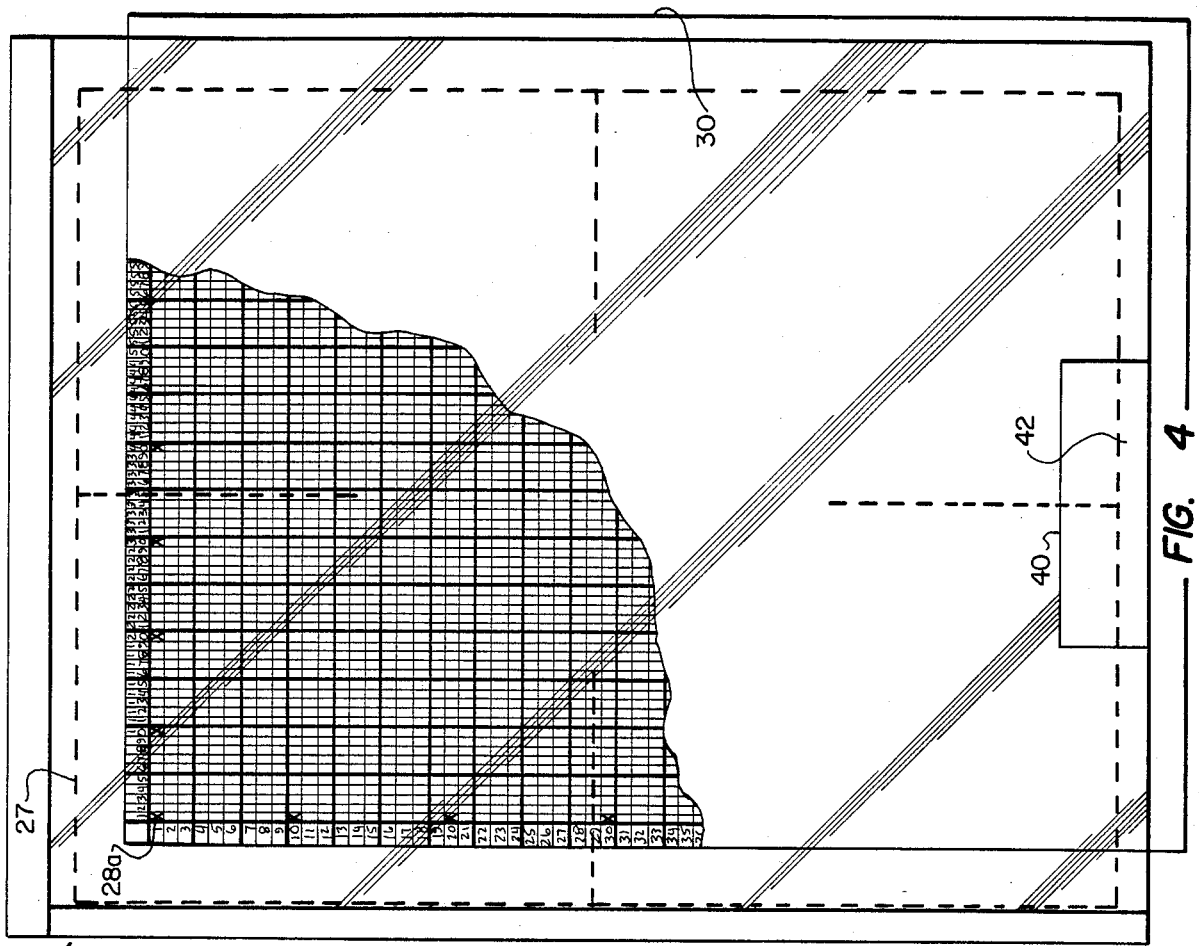
FIG. 4 is a plan view of the apparatus of the invention with the grid sheet positioned between the cover sheet and base sheet.

Attention is now directed to FIG. 4 which shows the device of the invention 20 with grid sheet 30 in place in the unit. The grid sheet is placed over the base sheet and over the margin locator sheet if such a sheet is used, and is located so that the upper left-hand margin locator indicia 28a is positioned at grid location 1—1. This is the standard preferred location for word processors whose scales 16 are arranged to occupy substantially the entire screen of the word processors without regard to where the margin stops are set on the printer. If the device is to be used with a word processor of the kind where the scales 16 are set to conform with the edge of the paper placed in the printer, then the grid sheet 30 is positioned against the alignment means at the top and left-hand edge of the unit. FIG. 4 also illustrates quite clearly the paper size indicia 27 mentioned above.

Attention is now directed to FIGS. 5, 6 and 7 which show the device of the invention in use. FIG. 5 is substantially like FIG. 4 in that it shows the grid sheet 30 in position in the device 20. However, there is shown in addition an index card or small envelope 35 which has been abutted against the left-hand abutment element 26 and against a top abutment element 36a, which appears most clearly in FIG. 6. FIG. 6 also shows in an edge—on view the cover sheet 22, the base sheet 21, the grid sheet 30 and the index card or an envelope 35 as well as a sheet of paper 36 carrying the margin indicia 28. It should be noted that in FIG. 6, as well as in FIG. 7 discussed below, that the thicknesses of the various sheets and components are exaggerated for the sake of clarity. FIG. 6 also shows at the top edge strips 37 which serve to stiffen and protect that edge.

At the bottom of FIG. 6 there can be seen the details of the magnetic clamp means including magnet 40, steel strip 41, the magnet being mounted on the underside of cover sheet 22 and the steel strip being mounted on the upper surface of the base sheet 21. An outer cover strip 42 overlies the portion of cover sheet 22 where the magnet is located and serves to indicate to the user the position of the clamp.

Attention is now directed to FIG. 7 which is a bottom edge view of the unit of FIG. 6. In that figure there can be seen the alignment means or abutment strip 26, the cover sheet 22, the base sheet 21, the margin indicator sheet 36 and the grid sheet 30. FIG. 7 also shows a strip 43 along the back of the left-hand margin of the unit, which strip serves to protect and stiffen that edge of the device.

With the foregoing description of the apparatus of the invention in hand, its mode of operation can now be outlined, particularly with reference to FIGS. 4 and 5. The user first makes a margin indicia sheet 36 by typing and printing on the word processor a horizontal row of x's or indicia 28 at the top margins set of the printer, and a vertical row of indicia 28 at the left-hand margin set of the printer. It is preferred that the individual indicia be spaced 10 units apart both in the horizontal line of indicia and the vertical line of indicia. The margin indicator paper or sheet 36 is then placed between the cover sheet 22 and the base sheet 21 and pushed against the left-hand abutment means 26 and the top edge abutment means 36a, with the situation then resulting substantially as FIG. 2 appears.

Next the grid sheet 30 is placed under the cover sheet and on top of the base sheet and margin indicator paper combination. The grid position 1—1 is positioned directly over the upper left-hand corner indicia marked 28a, and the situation is thus as shown in FIG. 4. The margin indicator paper 36 is held in position by the sticky adhesive areas 29 (see FIG. 2) and the bottom edge of the device is held closed by the magnetic clamp indicated at 40 and 42 in FIG. 4, thus maintain the grid sheet in proper position with the additional aid of sticky area 29a.

Next a sample of the work paper to be printed on is inserted into the unit underneath the grid sheet but above the margin indicator sheet and is pushed against the upper abutment means 36a and the left-hand abutment means 26 as is shown in FIG. 5. The user by inspection can now determine the grid indicia which indicate the place where it is desired to print the material which is planned to be printed. In FIG. 5 the name James Steele is shown starting at grid location 15-5, and if the user wants to print at that location, he or she moves the cursor 15 (see FIG. 1) to a corresponding location on the word processor/cathode ray tube screen, and having done so, keys in on the key board the textual material desired to be so placed.

The user then loads the printer or the word processor with an index card corresponding to card 35 in shape and size and directs the word processor to print. It does so, and the printing is located as shown on the card 35 in FIG. 5.

If it is desired to print in the blanks of a blank form, the blank form is inserted into the device 20 in a position corresponding to that of the index card 35, and the reader by observation can locate with good precision the grid position of each and every blank on the blank form. The cursor can then be moved to those various grid positions as the textual material which fills in the blanks is keyed into the word processor memory. The blank form is then inserted into the printer of the word processor without changing the margin stops of the printer which correspond to the margin of the indicia 28 of the unit 20, and the word processor is activated to direct the printer to print. The printer does so and properly locates the textual material in the various blanks on the form.

As was mentioned above, the margin indicator paper or sheet 36 may be omitted if desired and the most common or frequently used margin settings can be marked by indicia placed directly on the upper surface of the base sheet 21.

From the foregoing it can be seen that a simple inexpensive and easy-to-use device is provided for facilitating the layout of work to be produced by a word processor.

What is claimed is:

1. Apparatus for facilitating lay-out work with a word processor comprising:
   a rectangular base sheet;
   a rectangular transparent cover substantially equal to the base sheet in length and width;
   said cover sheet overlying said base sheet in substantial registry therewith and being attached thereto along one mutual edge thereof;
   magnetically actuated clamp means on said base sheet and said cover sheet adjacent edges thereof opposite said edge of attachment;
   linear alignment means positioned between said base sheet and said cover sheet along said edge of attachment and along an edge adjacent thereto;
   and a transparent grid sheet having rectilinear grid indicia thereon, said grid sheet being positionable between said base sheet and said cover sheet.

2. Apparatus in accordance with claim 1 and further comprising a margin locator sheet having margin indicia thereon along two adjacent edges, said margin locator sheet being insertable between said base sheet and said cover sheet and abuttable against said linear alignment means.

3. Apparatus in accordance with claim 1 and further comprising tacky adhesive areas on said base sheet for facilitating the maintenence of any sheet placed thereon in selected position.

4. Apparatus in accordance with claim 1 and further comprising a tacky adhesive area on the underside of said cover sheet for facilitating the maintenence of any sheet placed thereunder in selected position.

5. Apparatus in accordance with claim 1 in which said linear alignment means comprise abutment strips attached to said base strip along said edge of attachment and said edge adjacent thereto.

6. Apparatus in accordance with claim 1 in which said magnetically actuated clamp means on said base sheet and cover sheet comprise a magnet mounted on one of said sheets and a piece of magnetically responsive material mounted on the other of said sheets, said magnet and said responsive material being in at least partial areal alignment when said sheets are in overlying relationship.

7. Apparatus in accordance with claim 1 and further comprising margin indicia on said base sheet.

8. Apparatus in accordance with claim 1 in which the rectilinear grid indicia on said grid sheet are dimensioned to conform with a selected type size.

9. Apparatus in accordance with claim 1 in which the rectilinear grid indicia on said grid sheet are numerically labelled along their margins.

10. Apparatus in accordance with claim 1 and further comprising indicia on said cover sheet outlining the size of a selected stationery sheet size.

* * * * *